(12) United States Patent
Patenge et al.

(10) Patent No.: US 12,121,818 B2
(45) Date of Patent: *Oct. 22, 2024

(54) SYSTEMS AND METHODS FOR INCENTIVIZING PARTICIPATION IN GAMEPLAY EVENTS IN AN ONLINE GAME

(71) Applicant: Kabam, Inc., San Francisco, CA (US)

(72) Inventors: Luther Patenge, San Francisco, CA (US); Dylan Ortiz, San Francisco, CA (US); Luc Pieron, San Francisco, CA (US); Thomas Baxter, Millbrae, CA (US); Henry Rull, Concord, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,988

(22) Filed: Nov. 30, 2023

(65) Prior Publication Data
US 2024/0100441 A1  Mar. 28, 2024

Related U.S. Application Data

(63) Continuation of application No. 18/163,756, filed on Feb. 2, 2023, now Pat. No. 11,925,868, which is a continuation of application No. 17/241,021, filed on Apr. 26, 2021, now Pat. No. 11,583,776, which is a continuation of application No. 16/658,451, filed on Oct. 21, 2019, now Pat. No. 10,987,590, which is a continuation of application No. 14/495,880, filed on Sep. 24, 2014, now Pat. No. 10,463,968.

(51) Int. Cl.
*A63F 13/35* (2014.01)
*A63F 13/69* (2014.01)

(52) U.S. Cl.
CPC ............. *A63F 13/69* (2014.09); *A63F 13/35* (2014.09)

(58) Field of Classification Search
CPC .................................. A63F 13/35; A63F 13/69
See application file for complete search history.

(56) References Cited

U.S. PATENT DOCUMENTS

2020/0330879 A1   10/2020   Howell
2023/0398445 A1   12/2023   Wei

*Primary Examiner* — Thomas H Henry
(74) *Attorney, Agent, or Firm* — Esplin & Associates, PC

(57) ABSTRACT

Systems and methods for incentivizing user participation in gameplay events that take place in an online game are presented herein. The gameplay events may include one or more time intervals that take place during the duration of the gameplay event. The time intervals may be associated with incentivizing one or more actions and/or activities by the users during the intervals. The users may be distributed awards based on their performance during the intervals. The awards associated with time interval performance may impact awards distributed based on final ranking in the gameplay event.

17 Claims, 4 Drawing Sheets

SYSTEMS AND METHODS FOR INCENTIVIZING PARTICIPATION IN GAMEPLAY EVENTS IN AN ONLINE GAME

FIELD OF THE DISCLOSURE

This disclosure relates to gameplay events in an online game and, more specifically, to activating timed intervals during the gameplay events where users are rewarded based on specific performance within the intervals.

BACKGROUND

Users may access virtual spaces via client computing platforms. A virtual space may include, for example, an online game. Content within the online game may include game entities that represent users and/or virtual objects that are available for use by the users. Game entities may include one or more of a virtual character, group of characters, a virtual object, a battalion, a clan, a unit, a village, an army, and/or other considerations. Virtual objects may include virtual items and/or goods. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a character, a troop or troop type, a pet, a virtual resource, and/or other virtual items and/or goods. Events may take place in the online game, such as a tournament. Users may be awarded virtual items based on their performance in the events.

SUMMARY

User participation in online gameplay events (e.g., tournaments, battles, challenges, etc.) may be driven by the opportunity to obtain awards based on performance in the event (e.g., rewarding users for placing $1^{st}$, $2^{nd}$, and/or $3^{rd}$). User participation in the gameplay events may spike and/or otherwise increase towards the end of the gameplay events where users more or less "scramble" to increase their final ranking. As such, one or more implementations of the system presented herein aim to incentivize user participation during other times of the gameplay events. For example, one or more time intervals may be "activated" during the gameplay event where user participation is incentivized by the opportunity to win additional awards. In some implementations, the awards associated with the time intervals may impact the final awards obtained based on final ranking. As such, user participation during the different time intervals, as well as through to the end of the gameplay events, may be increased, thereby enhancing the gameplay experience of the users participating in the events.

In some implementations, the system may comprise one or more physical processors configured to execute one or more computer components. The computer components may be executed to implement an instance of a virtual space and/or an online game taking place within the virtual space and to facilitate the participation of one or more users in the virtual space and/or the online game. The computer program components may include one or more of a space component, an event hosting component, a gameplay metric component, an award component, and/or other components.

The space component may be configured to execute an instance of an online game. The online game may take place in a virtual space. The space component may be configured to implement the instance of the online game to facilitate user participation in the online game. Users may participate in the online game by controlling game entities in the virtual space. Users may participate in the one or more gameplay events that take place in the online game.

The event hosting component may be configured to facilitate gameplay events for the users of the online game. Events in the online game include one or more of a tournament, match, campaign, battle, siege, and/or other considerations of gameplay events where performance relative to other users may be quantitatively measured. The events may include one or more time intervals that take place within the duration of the gameplay event. The intervals may be separate and distinct start and end times. Actions and/or activities by the users during the time intervals may be incentivized by providing users awards based on performance during the time intervals.

The gameplay metric component may be configured to determine values for a gameplay metric. The gameplay metric may reflect one or more aspects of gameplay (e.g., actions and/or activities) in the online game by the users during the gameplay events.

The award component may be configured to distribute awards to the users based on performance within the gameplay events. The awards may include awards associated with determined changes in the respective values of the gameplay metric for the users. Changes in values may be determined for individual ones of the users in association with individual ones of the time intervals. These changes may reflect the users' relative performance during the intervals. Changes in values may be determined for the users in association with the gameplay event as a whole. These changes may reflect the users' relative performance over the entire gameplay event. The awards that may be distributed based on user performance within a time interval may impact the awards that may be distributed based on user performance within the entire gameplay event.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
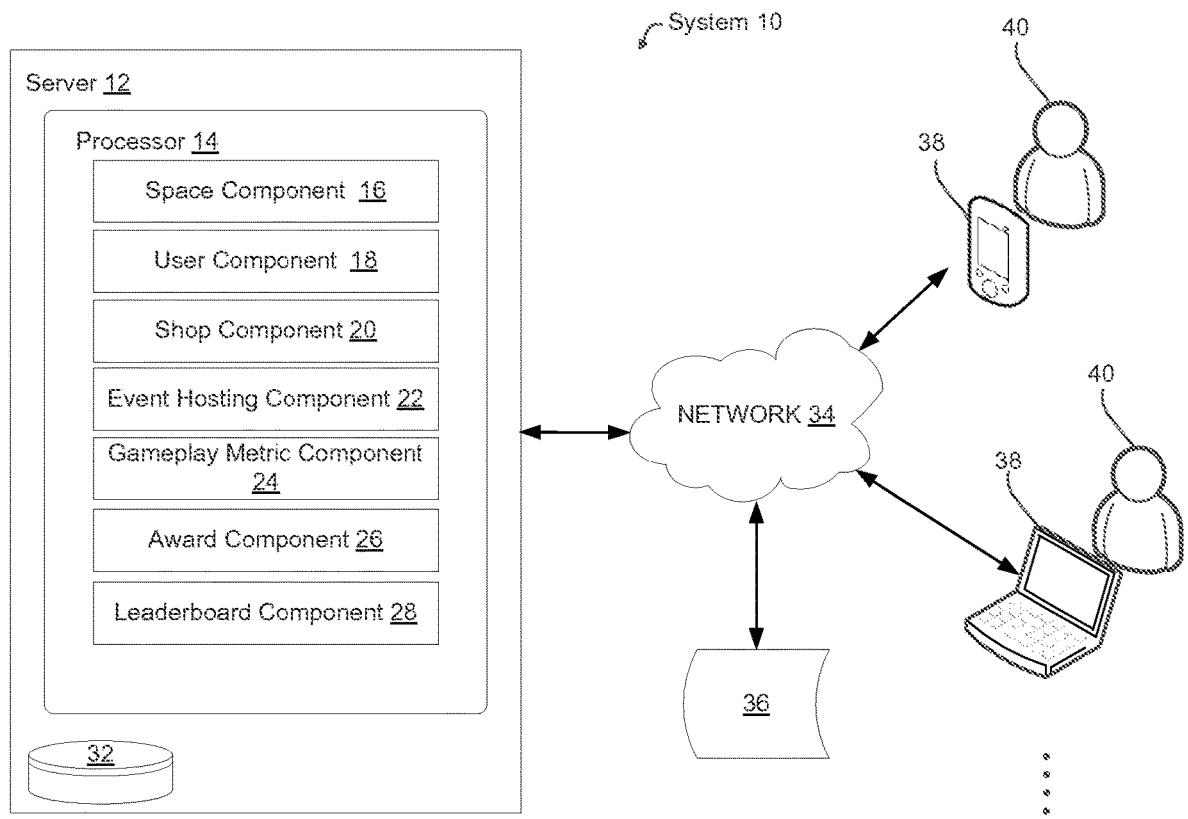
FIG. 1 illustrates a system for incentivizing user participation in gameplay events that take place in an online game, in accordance with one or more implementations.

FIG. 1 illustrates a system 10 for incentivizing user participation in gameplay events that take place in an online game. The online game may take place within a virtual space. Users may participate in the virtual space and/or the online game by controlling game entities that represent the users in the virtual space. Game entities may include one or more of a virtual character, group of characters, a virtual object, a battalion, a clan, a unit, a village, an army, and/or other considerations. Users may participate in one or more gameplay events that take place in the virtual space. Events in the virtual space include one or more of a tournament, a match, a campaign, a battle, a siege, and/or other considerations of gameplay events where performance relative other users may be quantitatively measured.

Virtual objects may include virtual items and/or goods. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual item and/or good.

In FIG. 1, providing the virtual space may include hosting the virtual space over a network 34, such as the Internet. A host server 12 may include one or more processors configured to execute one or more computer components for implementing an instance of a virtual space and/or an online game taking place within the virtual space and to facilitate the participation of one or more users in the virtual space and/or the online game. The server 12 may include processor(s) 14.

The computer program components may include one or more of a space component 16, a user component 18, a shop component 20, an event-hosting component 22, a gameplay metric component 24, an award component 26, a leaderboard component 28, and/or other components. The server 12 may be configured to communicate with one or more client computing platforms 38, according to client/server architecture, and/or other considerations. The client computing platforms 38 can include, for example, a cellular telephone, a smartphone, a laptop, a tablet computer, a desktop computer, a television set-top box, smart TV, a gaming console, and/or other considerations. The users 40 may access system 10 and/or the virtual space via the client computing platforms 38.

The space component 16 may be configured to implement an instance of the virtual space executed by the computer components to determine state of the virtual space. The state may then be communicated (e.g., via streaming visual data, object/position data, and/or other state information) from server 12 to client computing platforms 38 for presentation to users 40. The state determined and transmitted to a given client computing platform 38 may correspond to a view for a user character (or other game entity) being controlled by a user 40 via input devices (e.g., a controller) at the given client computing platform 38. The state determined and presented to a given client computing platform 38 may correspond to a location in the virtual space (e.g., location in the game). The view described by the state for the given client computing platform 38 may correspond, for example, to the location from which the view is taken, the location the view depicts, and/or other locations, a zoom ratio, a dimensionality of objects, a point-of-view, and/or parameters of the view. One or more of the view parameters may be selectable by the users 40.

An instance of the virtual space may comprise a simulated space that is accessible by users 40 via clients (e.g., client computing platforms 38) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the virtual space is determined by space component 16 is not intended to be limiting. The space component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 16, users 40 may control game entities, simulated physical phenomena (e.g., wind, rain, earthquakes, and/or other phenomena), and/or other elements within the virtual space to interact with the virtual space and/or each other. The game entities may include virtual characters such as avatars. As used herein, the term character may refer to a game entity present in the virtual space that represents an individual user. A game entity may be controlled by the user 40 with which it is associated. The user-controlled element(s) may move through and interact with the virtual space (e.g., non-user characters in the virtual space, other objects in the virtual space). The user-controlled elements controlled by and/or associated with a given user 40 may be created and/or customized by the given user. The user may have an "inventory" of virtual items and/or currency that the user can use (e.g., by manipulation of a game entity or other user-controlled element, and/or other items) within the virtual space.

The users may participate in the instance of the virtual space by controlling one or more of the available user-controlled game entities in the virtual space. Control may be exercised through control inputs and/or commands input by the users through client computing platforms 38. The users may interact with each other through communications exchanged within the virtual space. Such communications may include one or more of textual chat, instant messages, private messages, voice communications, and/or other communications. Communications may be received and entered by the users 40 via their respective client computing platforms 38. Communications may be routed to and from the appropriate users through server 12 (e.g., through space component 16) and/or through communications which are external to the system 10 (e.g., text messaging services associated with the client computing platforms 38).

The instance of the virtual space and/or the online game that takes place therein may be persistent. That is, the virtual space and/or the game may continue on whether or not individual players are currently logged in and/or participating in the game. A player who logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes experienced by non-player characters, changes to the virtual items available for use in the online game, and/or other changes.

The instance of the virtual space and/or online game may include events that take place in the virtual space. Events in the virtual space include one or more of a tournament, match, campaign, battle, siege, challenge, and/or other considerations of events. Events may correspond to gameplay where users control game entities and interact with other users controlling game entities, with artificial intelligence-controlled entities, and/or other considerations of gameplay within the events. Participation in events may be monitored and/or otherwise determined such that the performance of users relative to other users in the events may be quantitatively valued.

The user component 18 may be configured to access and/or manage one or more user profiles and/or user information associated with users of the system 10. The one or more user profiles and/or user information may include information stored by server 12, one or more of the client computing platforms 38, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), virtual inventory information (e.g., virtual inventories associated with the users that include one or more virtual items available for the users in the virtual space), relationship information (e.g., information related to relationships between users in the virtual space), virtual space usage information (e.g., a login history indicating the frequency and/or amount of times the user logs in to the user accounts), demographic information associated with users, interaction history among users in the virtual space, information stated by users, browsing history of users, a client computing platform identification associated with a user, a phone number associated with a user, attribute information, and/or other information related to users.

The attribute information managed by the user component 18 may comprise one or more attributes and/or attribute values associated with the attributes. In some implementations, the attributes described herein may correspond to one or more game entities associated with a user and/or the users themselves. By way of non-limiting example, a gain in a value for an attribute of a particular game entity may be extended as a gain for a value of a same or similar attribute associated with the user (and perhaps with other game entities associated with the user). That is to say, an attribute that describes characteristics of the game entity may be used to describe characteristics of the user, and/or an attribute that describes characteristics of the user may be used to describe characteristics of one or more game entities associated with the user.

A value of an attribute may describe a state of a characteristic associated with the user and/or game entity in the online game. For example, a common attribute is experience (XP). Other examples of attributes may include a reputation score, a rank, a skill score, a level of knowledge, average spending, a role, a class, a handle (e.g., username), alliance(s), friend(s), health (e.g., hit points), strength, power, mana, valor, might, spells, morale, speed, level, appearance, race, initiative score, skills, defense abilities, attack abilities, special abilities, production rate, upkeep, virtual items produced, technology produced, and/or any other attributes. The value of a given attribute may be numerical (e.g., points, amount, score, rank, ratings, grades, or any other type of numerical value), descriptive (e.g., text for name, race, role, and/or other considerations), progressive (e.g., high, medium, low, and/or other considerations), pictorial (e.g., an image representing a group of users associated with the user, and/or other considerations), and/or any other type of value for an attribute.

The user information associated with a given user as managed by the user component 18 may include information indicating inventory associated with the user in the online game. An inventory associated with a given user may provide an accounting of virtual items, such as virtual buildings, resources, weapons, objects, and/or any other virtual items; characters, such as a user-controlled game entity, avatar, troop, and/or any other type of user-controlled game entity; virtual currencies; and/or any other virtual space elements that have been procured, controlled by, and/or otherwise associated with a given user in the online game. Such accounting of items associated with users may reflect a balance (e.g., a quantity of the entities associated with the user in the online game). By way of a non-limiting example, the given user may have an X number of virtual currencies, a Y number of a virtual resources (e.g., iron, ore, wood, coal, etc.), a Z number of troops, and/or any other entities associated with the user in the online game.

In some implementations, a valor attribute associated with a game entity may reflect relative experiences and/or actions by the user controlling the associated game entity in the virtual space. The valor attribute may be a measure of the game entity's performance and/or capabilities to defeat enemies, inflict damage, collect resources, achieve objectives, and/or other considerations. For example, a game entity may gain and/or lose valor depending on the strength, resulting performance, and/or capabilities in the virtual space. In some implementations, with a certain amount of valor the game entity attains in the virtual space, the game entity may become more powerful and capable, which may be reflected by enhancements in various characteristics associated with the game entity. In some exemplary implementations, the valor associated with the game entity may be manifested via number(s) expressed as experience points ("XP"), and/or other considerations.

Figure 2:
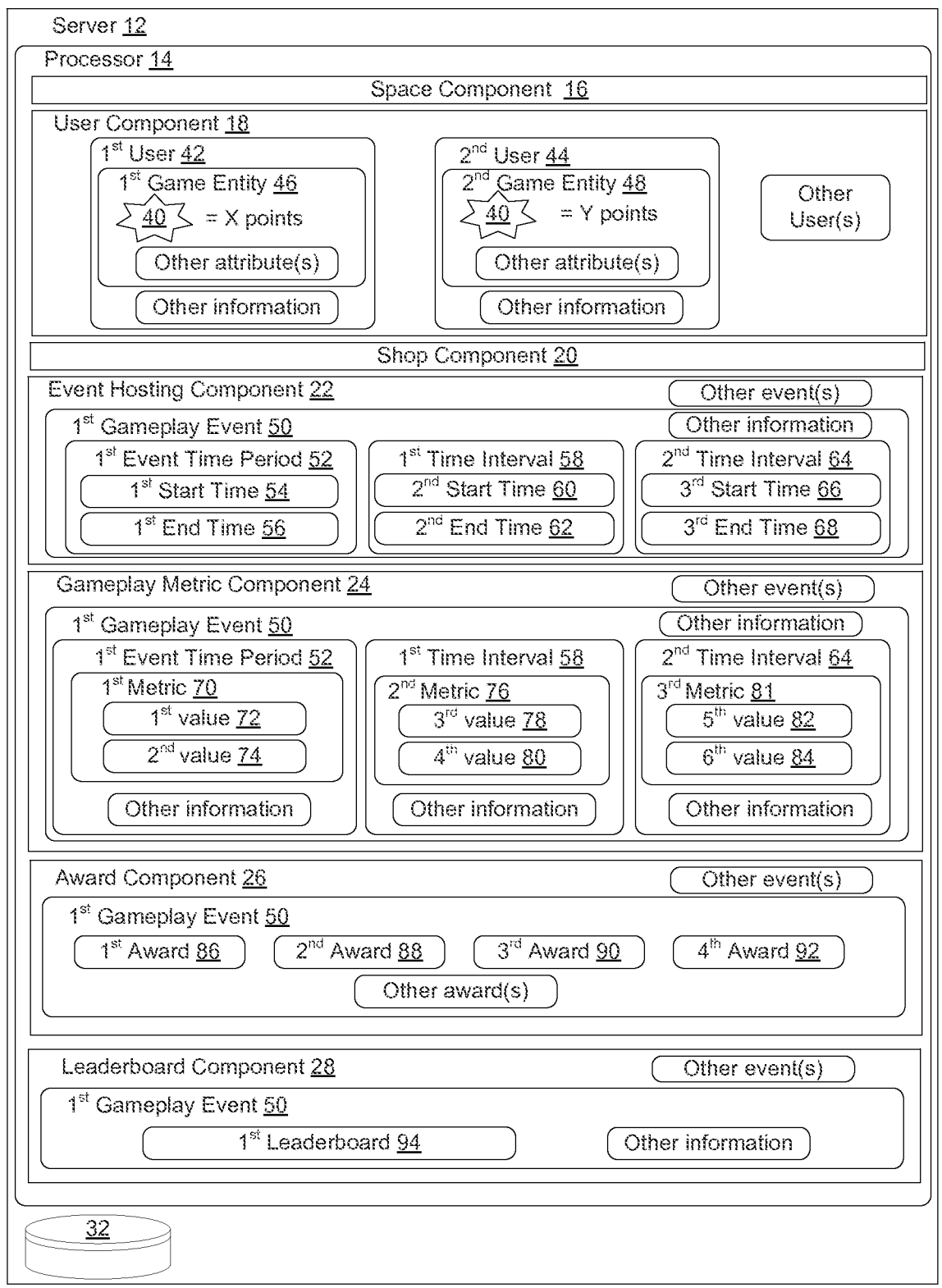
FIG. 2 illustrates an implementation of a server employed in the system of FIG. 1.

By way of illustration in FIG. 2, the user component 18 may be configured to manage user information for a first user 42, a second user 44, and/or other users. The user information managed for the first user 42 may include information corresponding to a first game entity 46 associated with the first user 42, and/or other information. The information corresponding to the first game entity 46 may include a first attribute 40 and/or other information. A corresponding value of the first attribute 40 and/or other attribute (e.g., a point value, a non-numerical value, and/or other considerations) may be stored. The value of the first attribute 40 may be determined, changed, and/or updated based on gameplay by the first user 42 in the online game while using the first game entity 46, and/or other considerations.

The user information managed for the second user 44 may include information corresponding to a second game entity 48 associated with the second user 44. The information corresponding to the second game entity 48 may include the first attribute 40 of the second game entity 48, and/or other attribute(s). A corresponding value of the first attribute 40 for the second game entity 48 and/or other attribute (e.g., a point value, a non-numerical value, and/or other considerations) may be stored. The value of the first attribute 40 for second game entity 48 may be determined, changed, and/or updated based on gameplay by the first user 42 in the online game, and/or other considerations.

Returning to FIG. 1, in some implementations, the shop component 20 may be configured to present offers to sell instances of virtual items to users in a virtual shop. The virtual shop may be a simulated environment within the virtual space which is accessible by users and presents the views of the virtual shop to the users. Users may access the virtual shop through one of a variety of ways. Users may access the virtual shop through the manipulation of one or more entities associated with the user within the virtual space using control inputs and/or commands input by the users through client computing platforms 38, and/or other ways of access.

Manipulation of a game entity may include moving the game entity through the virtual space using control inputs and/or commands input by the users through client computing platforms 38 to move the one or more entities to the simulated environment designating the location of the virtual shop within the virtual space.

Users may use control inputs and/or commands not associated with a game entity to access the virtual shop. Control inputs and/or commands may automatically present the instance of the virtual shop on the client computing platforms 38 (e.g., user selects a virtual shop button to automatically be taken to the virtual shop).

The instance of the virtual shop may be presented to users through a shop interface. The shop interface may be configured to present the offers to sell virtual items to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space and which can be depleted), and/or include one or more objects (e.g., one or more virtual items, a virtual teller, and/or other objects) positioned within the topography that may be capable of locomotion within the topography. The virtual shop may display the virtual items and/or the one or more sets of virtual content available for purchase by the users. Users may view the virtual items (e.g., individual virtual items and/or sets of virtual items) available for purchase. Users may purchase the virtual items using virtual (or real) currency. Transactions may take place with the virtual teller, through various other actions of the user within the instance of the virtual shop, and/or other offer/transaction mechanisms. In some implementations, the virtual shop component 20 may be configured to manage transfer of instances of virtual items of value and instances of placeholder items to user inventories in response to purchase of the virtual items of value and placeholder items.

In some implementations, users may purchase virtual items and/or goods via the virtual shop in preparation for gameplay events and/or during the gameplay events. In some implementations, the purchase of virtual items and/or goods by users participating in gameplay events may "spike" toward the end of the gameplay events. That is, users may purchase a higher quantity of virtual items and/or higher-valued virtual items and/or goods to enhance and/or increase their performance as the end of the gameplay events nears. This may give the users the opportunity to obtain more "points" and/or otherwise increase their performance relative to other users in order to get into the top ranking of players by the end of the gameplay event. In some instances, users may only minimally participate in the gameplay event up until the end of the gameplay event. As such, the participation level by users in the gameplay events in general may be minimal up until the near end of the events. However, in order to increase participation by users during the entirety of the gameplay event, one or more implementations of the system 10 presented herein contemplate providing incentives for user participation during one or more predetermined timed intervals that take place during the event. Participation by the users during these intervals may be incentivized by virtue of rewarding the users based on specific performance within the intervals.

The event-hosting component 22 may be configured to facilitate one or more gameplay events for the users of virtual space. By way of non-limiting example, the event-hosting component 22 may facilitate a gameplay event such that a user should undertake certain game actions or activities in the virtual space during an event time period. The users may be distributed awards based on their performance in the gameplay events. The event-hosting component 22 may be configured to facilitate gameplay events by specifying the event time period, a start time of the event time period, an end time of the event time period, and/or other considerations. In some implementations, the event-hosting component 22 may be instructed by the provider(s) of the virtual space to start facilitating a given gameplay event for the users of the virtual space. For instance, control information entered and/or selected by the provider(s) of the virtual space may be received by the event-hosting component 22, instructing the event-hosting component 22 to start facilitating a gameplay event for the users of the online game, and/or other considerations. In some implementations, the event-hosting component 22 may be configured to facilitate one or more gameplay events on a periodic basis, and/or on some other basis.

In some implementations, the event-hosting component 22 may be configured such that facilitating gameplay events comprises determining one or more time intervals within the event time periods of gameplay events. Individual ones of the time intervals may be shorter than the duration of the gameplay event. Individual ones of the time intervals may take place during the duration of the gameplay event. For example, a time interval may have a start time that is temporally after a start time of the gameplay event. A time interval may have an end time that is temporally before an end time of the gameplay event. In some implementations, the determination of one or more time intervals for a given gameplay event may comprise determining a successive temporal order of the time intervals within the duration of the gameplay event. In some implementations, if a gameplay event is associated with more than one time interval, the time intervals may or may not overlap.

The one or more time intervals may correspond to user participation-incentivizing sub-events that take during the gameplay event. That is, a given time interval may correspond to an interval of time during the gameplay event where one or more particular game actions and/or activities in the gameplay event may be incentivized. The actions and/or activities may be determined based on a determination of a particular gameplay metric, or change in the gameplay metric, associated with the interval and/or gameplay event in general (see, e.g., the gameplay metric component 24). In some implementations, the one or more particular actions and/or activities associated with the time intervals may be the same as the one or more actions and/or activities undertaken by the users associated with the gameplay event. In some implementations, the certain actions and/or activities associated with a given time interval may be different from the actions and/or activities associated with gameplay event.

The certain game actions and/or activities associated with the time intervals may be incentivized by providing the users with awards based on their performance in the gameplay event during individual ones of the time intervals. For example, a given time interval may be associated with incentivizing actions by the users that cause the user to increase a given gameplay metric. The performance of the user during the given time interval resulting in an increase in the gameplay metric may result in the user being determined to receive an award and/or prize. In some implementations, the awards for performance during different time intervals may also be different. In some implementations, the awards for performance during the different time intervals may be the same. In some implementations, the awards for performance during the time intervals may vary depending on a qualitative measure of the user's performance (see, e.g., gameplay metric component 24). For example, in some implementations, the greater the performance by the user of a certain action and/or activity during a time interval may result in a higher-valued award for that performance, and/or other considerations. In some implementations, the awards for performance during the different time intervals may impact the awards for performance during the entire event period of the gameplay event (see, e.g., the award component 26).

The determined one or more time intervals may be respectively "activated" during the event period of a corresponding gameplay event. A given time interval may be activated by establishing an interval clock, countdown, stopwatch, and/or other technique by which one or more of the interval duration, interval start time, and/or interval end time may be presented to the users in the virtual space. As such, the activation of the time intervals may provide an indication to the users that performance of a specific action and/or activity to increase a gameplay metric may be measured and/or that the users have the opportunity to obtain an award based on their performance during the intervals. Measuring user performance during the time intervals and/or gameplay events may be described in more detail with reference to gameplay metric component 26.

In some implementations, the event-hosting component 22 may be configured to effectuate presentation of notifications to the users of a gameplay event that are associated with the one or more time intervals. This may include effectuating presentation of one or more of the interval duration, an interval start time, and interval end time, and/or other notifications. By way of non-limiting example, in FIG. 3, a notification 98 within a user interface 96 may include presentation of information that indicates that a time interval is taking place or is going to take place. The notification 98 may indicate the gameplay metric, actions and/or activities to increase the gameplay metric, and/or other information related to the time interval. The notification 98 may include information indicating an award or type of an award the users may obtain based on their relative performance during the interval, and/or other information. It is noted that notifications presented to users during a gameplay event may include more or less information. For example, a notification may include a stopwatch that may be displayed on-screen that provides a countdown of a time interval. Notifications may be considered in other ways.

In some implementations, the event hosting component 22 may be configured to facilitate gameplay events based on information determined and/or obtained from other components such as the gameplay metric component 24, award component 26, leaderboard component 28, and/or other components.

By way of non-limiting illustration, in FIG. 2, the event-hosting component 22 may be configured to facilitate a first gameplay event 50 and/or other gameplay events. Facilitating the first gameplay event 50 may include facilitating participation by the first user 42, the second user 44, and/or other user(s) in the first gameplay event 50. The first gameplay event 50 may take place during a first event time period 52. The first event time period 52 may be defined by a first start time 54, a first end time 56, duration, and/or other information.

In some implementations, the event-hosting component 22 may be configured such that facilitating the first gameplay event 50 includes determining a first time interval 58 of the first event time period 52. The first time interval 58 may be defined by a second start time 60, a second end time 62, duration, and/or other information. The first time interval 58 may take place within the first event time period 52. The second start time 60 may take place temporally after the first start time 54. The second end time 62 may take place temporally before the first end time 56.

In some implementations, the event component 22 may be configured such that facilitating the first gameplay event 50 includes determining a second time interval 64 of the first event time period 52. The second time interval 64 may be defined by a third start time 66, a third end time 68, duration, and/or other information. The second time interval 64 may take place within the first event time period 52. The second time interval 64 may take place temporally after the first time interval 58. The third start time 66 may take place temporally after the first start time 54, the second start time 60, both, and/or other considerations. The third end time 68 may take place temporally before the first end time 56. The third end time 68 may take place temporally after the second end time 62.

Returning to FIG. 1, in some implementations, the gameplay metric component 24 may be configured to obtain one or more gameplay metrics for the gameplay events and determine values of the gameplay metrics for the users in the virtual space. The gameplay metric component 24 may be configured to obtain a gameplay metric for one or more time intervals associated with a gameplay event. The gameplay metric component 24 may be configured to obtain a gameplay metric that may be associated with the gameplay event as a whole. In some implementations, the gameplay metric component 24 may obtain gameplay metrics from the provider, administrator, moderator, and/or any other entities related to the online games, e.g., via a graphical user interface. For example, the provider(s) of the online game may provide one or more gameplay metrics of interest to the provider(s) via a graphical user interface for each gameplay event, time interval, and/or other considerations.

A given gameplay metric obtained by gameplay metric component 24 may include any variable related to gameplay (e.g., action and/or activity) by users in a gameplay event and/or a time interval within the gameplay event. A gameplay metric obtained by the gameplay metric component 24 may reflect (e.g., measure) one or more aspects of gameplay by users in the respective gameplay events, such as actions and/or activities performed by the user in the virtual space, and/or other considerations. Examples of a gameplay metric may include, but not be limited to, military power, commerce level, valor level, might level, production rate or output, a number of bosses killed, a number of quests engaged, an amount of virtual currency acquired, average spending, number of combats engaged in a period, most frequent game actions performed within a period (e.g., top 10), virtual items most used within a period (e.g., top 5), and/or other considerations.

For example, without limitation, a gameplay metric may be obtained by the gameplay metric component 24 to measure a valor level of users in a gameplay event. In another example, a gameplay metric may be obtained to measure production of virtual items by users in the gameplay event. In yet another example, a gameplay metric may be obtained to measure a number of combats engaged by the users in the gameplay event. Other examples of gameplay metric are contemplated.

As used herein, gameplay by users in a given gameplay event may refer to user actions and/or activities in a gameplay event for addressing, directly and indirectly, one or more objectives associated with the gameplay event and/or interval. Examples of gameplay by the users in the given gameplay event may include military actions (e.g., defeating opponents, NPCs, or other users' characters in encounters or combats), logistic actions (e.g., marching troops, transporting weapons, supplying food, resources, and any other logistic actions), planning actions (e.g., crafting weapons, raising troops, training troops, developing heroes, building or upgrading buildings, and any other planning actions), production actions (e.g., farming, prospecting, and mining for resources; producing units; and any other user actions related to production activities in the online game), commerce actions (e.g., trading for virtual resources and/or items), exploratory actions (e.g., exploring uncharted game space locations or area, surveying game space locations controlled by other users, and any other exploratory actions), social interaction actions (e.g., collaborating with other users, assisting other users, challenging other users, and/or any other social interaction actions), participation in a quest, campaign, event, team play, and any other type(s) of user actions and/or activities in the online game.

The gameplay metric component 24 may be configured to determine values of a gameplay metric for individual users in respective gameplay events. Determining gameplay metric values for users by the gameplay metric component 24 may include identifying and/or tracking user actions in the respective online game. For example, the gameplay metric component 24 may be configured to identify and track user inputs to the virtual space at any given time, during a specified time interval and/or time period, and/or other considerations. For instance, the gameplay metric component 24 may identify that a given user has attacked an NPC at a specific location within the gameplay event and gained a certain amount of valor, may identify that the given user has started a crafting process in the gameplay event to craft a rare virtual item, may identify that the given user has assisted another user in the gameplay event by transferring an amount of virtual resources to that user's inventory, and/or identify any other user actions in the respective gameplay event. Based on such identified user actions, the gameplay metric component 24 may determine a change in the value of corresponding gameplay metric(s) over time. For instance, without limitation, the user attacking the NPC and/or other users' characters within the gameplay event over a time interval may increase (or decrease) the value of a gameplay metric measuring valor (or other metric) of the user in the gameplay event by a certain amount of points.

In some examples, a gameplay metric obtained by gameplay metric component 24 may correspond to one or more attributes, the number of entities controlled by the users, and/or any other user information managed by user component 18 as specified by the provider, administrator, moderator, and/or any other entities related to the virtual space. In those examples, the gameplay metric component 24 may determine the values of the gameplay metric by simply examining and/or querying the relevant user information corresponding to the gameplay metric. For example, without limitation, the provider(s) of a given gameplay event may specify that the gameplay metric measuring user valor (or other metric) in the gameplay event should correspond to the valor attribute included in the user information associated with the user. In some implementations, the provider(s) of a given gameplay event may specify that the gameplay metric measuring user valor (or other metric) in the gameplay event should correspond to attack abilities of the game entity(s), attack power of the game entity, number and levels of troops, weapons, military buildings (e.g., towers) controlled by the users, and any other attributes reflecting valor (or other metric) of the users in the gameplay events. In another example, a gameplay metric measuring user commerce level in the gameplay event may be specified by the provider(s) of the gameplay event as corresponding to a number of commerce units controlled by the users (e.g., merchants), types of trading structure controlled by the users, number and level of transportation units controlled by the users, number of roads controlled by the users, types of transportation infrastructure controlled by the users, and/or any other attributes. In these examples, determining the values of such gameplay metric for the users by gameplay metric component 24 may involve obtaining the corresponding attribute values from the user component 18.

In some implementations, the gameplay metric component 24 may determine the values of a given gameplay metric for the users based on one or more functions, formulas, tables, or any other types of specifications provided by the provider, administrator, moderator, and/or any other entities related to the online games. For example, a given function, formula, table, or any other type of specification may specify an "action-for-point", "activity-for-point", and/or other conversion. For any given measure of a gameplay metric in a given gameplay event, a given function, formula, table, or any other type of specification may be provided by the provider(s) of the virtual space specifying points or other gameplay metric values associated with corresponding user actions and/or activities, attributes, and/or any other elements that may be used to quantify a value of the gameplay metric, and/or other considerations.

By way of non-limiting example, a table may specify that for every 100 units of troops (or other amount) trained by a given user, one valor (or other metric) point may be given to the user; for a level 1 barrack erected by the user, 1 valor (or other metric) point may be given to the user; for a level 10 sword (or other level and/or item) acquired by the user, 3 valor (or other metric) points may be given to the user; for every enemy defeated, an amount of valor points may be given to the user; and so on. In that instance, the gameplay metric component 24 may determine a value of the gameplay metric measuring valor of the given user in the given gameplay event in accordance with such a table. The discussion of "valor" above is not intended to limit the type of metric which may be quantified and/or measured during user participation in a gameplay event. Instead, this is simply an example, and is not limiting with respect to gameplay metric, quantification techniques, measurement techniques, functions, formulas, tables, and/or other characteristics.

Figure 3:
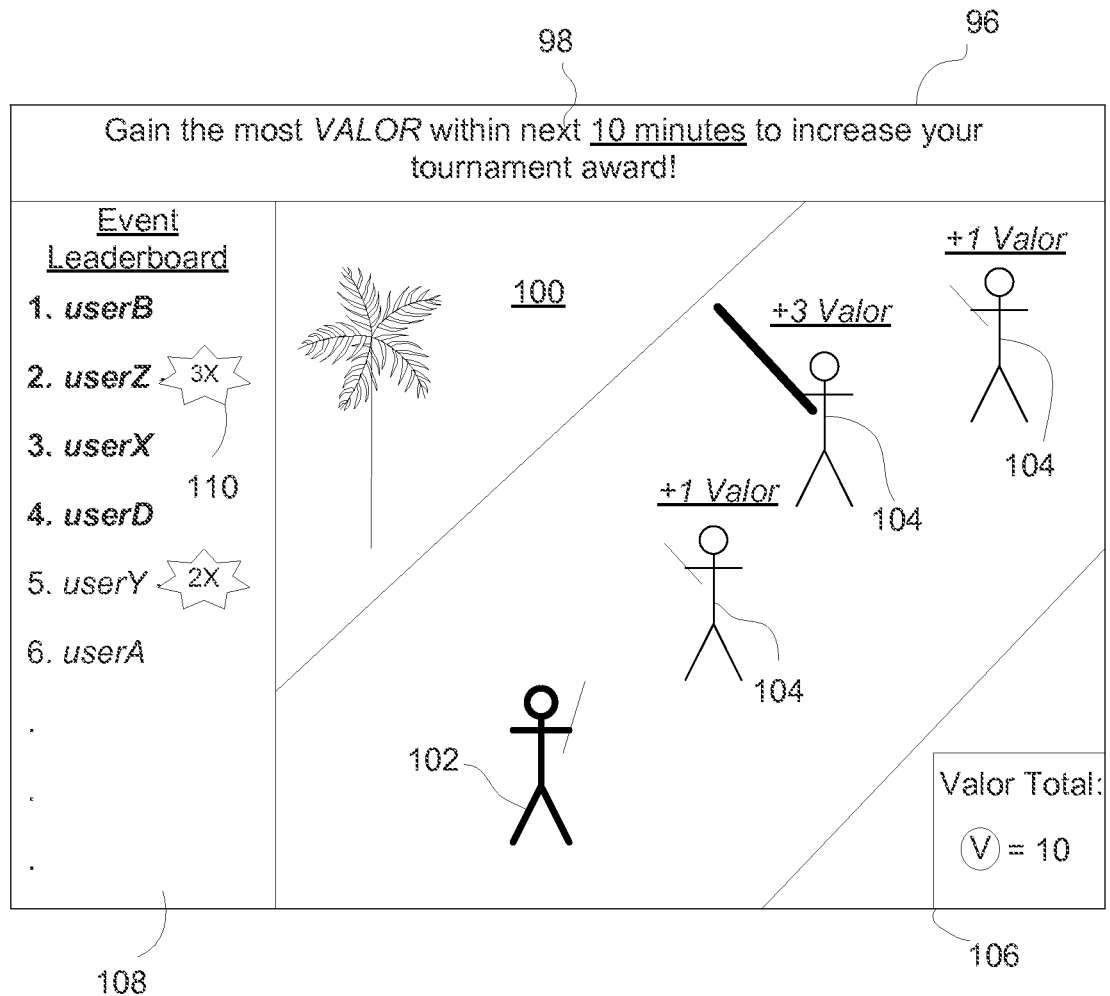
FIG. 3 illustrates an implementation of a user interface presented to a user in connection with an implementation of the system of FIG. 1.

By way of non-limiting illustration, in FIG. 3, the user interface 96 may depict a simulated gameplay portion 100 that shows the actions and/or activities of a game entity 102 controlled by an associated user (not shown). For example, the user may control the game entity 102 within the simulated environment of the gameplay portion 100 to defeat enemies 104 (e.g., other user-controlled game entities, non-player characters, and/or other considerations) and/or perform other actions and/or activities in connection to the gameplay event. One example of how a user may increase a value of a gameplay metric (e.g., valor, and/or other considerations) may include defeating the game enemies 104 and/or other considerations. In some implementations, the enemies 104 may be associated with an amount of valor that a user may obtain by defeating the enemy 104. The enemies 104 may be individually associated with a valor amount, for example, due to the difficulty in defeating the enemy 104, and/or other considerations. The user interface 96 may include a gameplay metric-tracking interface portion 106 that may allow the user to keep track of current value of the gameplay metric.

The discussion of user interface 96 above is not intended to limit how gameplay metrics may be defined, how users may acquire value for the gameplay metric, and/or how actions and/or activities may be carried out in a gameplay event. Instead, this is simply an example, and is not limiting with respect to gameplay metric, quantification techniques, measurement techniques, actions and/or activities within a gameplay event, and/or other characteristics of the virtual space.

By way of non-limiting illustration, in FIG. 2, the gameplay metric component 24 may be configured to obtain a first gameplay metric 70 for the first event time period 52 of the first gameplay event. The first gameplay metric 70 may correspond to a first action and/or activity, and/or set of actions and/or activities to be undertaken by the users participating in the first gameplay event 50. The gameplay metric component 24 may be configured to determine values for the first gameplay metric 70 for the first user 42 associated with the first event time period 52, including, but not limited to, a first value 72 and a second value 74. It is noted that the depictions of values in the drawings and accompanying descriptions are directed to performance values for the first user 42 in the first gameplay event 50. However, this is for purposes of clarity and is not to be considered limiting. In other implementations, it may be readily envisioned that determinations of values for gameplay metrics may be similarly performed for the second user 44 and/or other users.

With that being said, the first value 72 may correspond to a value of the first gameplay metric 70 at the first start time 54, and/or other considerations. The second value 74 may correspond to a value of the first gameplay metric 70 at the first end time 56, and/or other considerations. A change (e.g., increase or decrease) in the value of the first gameplay metric 70 for the first user 42 during the first event time period 52 may correspond to a difference between the second value 74 and the first value 72, and/or other considerations.

In some implementations, the gameplay metric component 24 may be configured to obtain a second gameplay metric 76 for the first time interval 58 of the first gameplay event 50. The second gameplay metric 76 may correspond to a second action and/or activity, and/or set of actions and/or activities to be undertaken by the users participating in the first gameplay event 50 during the first time interval 58. The gameplay metric component 24 may be configured to determine values for the second gameplay metric 76 for the first user 42 associated with the first time interval 58, including, but not limited to, a third value 78 and a fourth value 80. The third value 78 may correspond to a value of the second gameplay metric 76 at the second start time 60, and/or other considerations. The fourth value 80 may correspond to a value of the second gameplay metric 76 for the first user 42 at the second end time 62, and/or other considerations. A change (e.g., increase or decrease) in the second gameplay metric 76 for the first user 42 during the first time interval 58 may correspond to a difference between the fourth value 80 and the third value 78, and/or other considerations.

In some implementations, the gameplay metric component 24 may be configured to obtain a third gameplay metric 81 for the second time interval 64 of the first gameplay event 50. The third gameplay metric 81 may correspond to a third action and/or activity, and/or set of actions and/or activities to be undertaken by the users participating in the first gameplay event 50 during the second time interval 64. The gameplay metric component 24 may be configured to determine values for the third gameplay metric 81 for the first user 42 associated with the second time interval 64, including, but not limited to, a fifth value 82 and a sixth value 84. The fifth value 82 may correspond to a value of the third gameplay metric 81 at the third start time 66, and/or other considerations. The sixth value 84 may correspond to a value of the third gameplay metric 81 for the first user 42 at the third end time 68, and/or other considerations. A change (e.g., increase or decrease) in the third gameplay metric 81 for the first user 42 during the second time interval 64 may correspond to a difference between the sixth value 84 and the fifth value 82, and/or other considerations.

In some implementations, the first gameplay metric 70, the second gameplay metric 76, and third gameplay metric 81 may be the same gameplay metric. In some implementations, the first gameplay metric 70, the second gameplay metric 76, and third gameplay metric 81 may all be different gameplay metrics. In some implementations, the second gameplay metric 76 and third gameplay metric 81 may be the same gameplay metric while the first gameplay metric 70 may be a different gameplay metric. The gameplay metrics may be considered in other ways.

Returning to FIG. 1, award component 26 may be configured to determine awards for distribution to the users based on performance in the gameplay events. The award determination by the award component 26 may be based on values of the event metric(s), changes in the values of the gameplay metrics, and/or other performance criteria. Awards may be distributed based on performance criteria for individual ones of the time intervals and/or the gameplay event as a whole, and/or other considerations. For example, the changes in the values of the event metric(s) for the individual users may reflect their relative performance within the gameplay event as a whole and/or within one or more time intervals associated with the gameplay events.

In some implementations, the award component 26 may determine user rankings, scores, grades, ratings, and/or any gameplay event and/or time interval performance results, and determine the awards for distribution to the users based on such performance results. The awards determined by the award component 26 may include virtual items and/or virtual currencies usable in the online games—for example, an item, a good, an enhancement, an award multiplier, a gameplay metric value multiplier, a consolation prize, and/ or other considerations.

By way of non-limiting example, the award component 26 may determine rankings, scores, grades, ratings, and/or other performance results based on performance criteria for the individual time intervals and/or gameplay events as a whole. At its most basic level, performance criteria may be associated with the changes in the values of the gameplay metrics for the users, and/or other considerations. Performance criteria may specify that the user with the greatest increase in value of a given gameplay metric is to be distributed an award (e.g., is the "winner", highest ranked, and/or other considerations). However, performance criteria may be specified in other ways. For example, performance criteria may specify that the user with the highest rate of increase in the value of the gameplay metric within a given gameplay event and/or time interval may be distributed an award. Performance criteria may be considered in other ways.

In some implementations, performance criteria may be obtained from the provider, administrator, moderator, and/or any other entities related to the online games, and/or other considerations. The awards may be distributed by providing the award and/or an instance of the award to an inventory associated with the "winning" user. Awards determinations and/or distributions may be considered in other ways.

In some implementations, the award component 26 may be configured to determine awards for distribution to the users based on cumulative performance within the time intervals of a gameplay event. For instance, if a gameplay event includes two or more time intervals, a user may obtain an award if they "win" the majority of the time intervals (e.g., perform the best within a majority of the time intervals). This may create further incentive to perform well within all the time intervals, as well as during the gameplay event as a whole.

In some implementations, the awards distributed to the users based on performance in the intervals (herein "interval awards") may be dependent on and/or may impact the final awards distributed based on final ranking in the gameplay event as a whole (herein "event award"). For instance, the interval awards may enhance and/or increase a value and/or quantity of an event award. This may include designating the interval awards as "multipliers" that increase the event award, and/or other considerations. By way of non-limiting example, a given event award may correspond to one or more virtual items to be distributed to the users. A given interval award may correspond to a multiplier (e.g., 1.5×, 2×, 2.5×, 3×, and/or other considerations) that may increase the quantity and/or value of the virtual items associated with the event award. In such instances, the interval awards may be redeemed in conjunction with the event awards, and/or other considerations.

In some implementations, the interval awards may be dependent on the event awards. An interval award may not be redeemable by a user absent the user also obtaining an event award (e.g., based on final ranking). That is, an interval award may be a multiplier for an event award, but absent the user ranking high enough to receive an event award, the interval award may be of no value or even be usable. In some implementations, the interval awards may then simply be discarded at the end of the gameplay event, and/or other considerations.

In some implementations, the interval awards may be independent from the event awards. The interval awards may include one or more virtual items that may be distributed to the users based on performance in the time intervals, without consideration to the final ranking of the users. In some implementations, one or more virtual items associated with an interval award may be distributed to the users once the time interval has ended, once the gameplay event has ended, whether or not the user ranked high enough to receive an event award, and/or other considerations.

In some implementations, the interval awards may impact one or more attributes of a user and/or game entity associated with the user. The interval awards may impact an attribute that is associated with a gameplay metric for the particular interval. For example, a gameplay metric may correspond to an attribute and/or other user information managed by user component 18. A user may be distributed an interval award based on user performance with regard to having the greatest increase in the value of the gameplay metric during the time interval (e.g., relative to other players). The interval award may provide a multiplier that increases the value of the corresponding attribute. By way of non-limiting illustration, a gameplay metric for a time interval may correspond to actions and/or activities that increase the value of valor (e.g., associated with a valor attribute managed by the user component 18). An interval award may include a multiplier that increases the value of the corresponding valor attribute (or other attribute). As such, the value of the valor attribute (or other attribute) managed by the user component 18 may be increased by an amount specified by the multiplier. The increase in the value of the attribute may be effectuated at the end of the interval, at the end of the gameplay event, and/or other considerations.

The above discussion of event awards and interval awards is provided for illustrative purposes only and is not to be considered limiting. The relationships (or lack thereof) between event awards and interval awards may be considered in other ways. For example, a given user may be distributed both an interval award and an event award, an interval award only, an event award only, no awards, and/or other considerations.

By way of illustration, in FIG. 2, the awards component 26 may be configured to distribute awards to the first user 42, second user 44, and/or other users based on performance within the first gameplay event 50. The awards may include a first award 86 (interval award), a second award 88 (event award), a third award 90 (interval award), a fourth award 92 (award based on cumulative interval performance), and/or other awards. The first award 86 may be associated with determined changes in the respective values of the second gameplay metric 76 for the first user 42, second user 44, and/or other users. For example, the determined change for the second gameplay metric 76 for the first user 42 may be the difference between the fourth value 80 and the third value 78 (e.g., obtained from the gameplay metric component 24). The first award 86 may include, for example, an event award multiplier, one or more virtual items, an attribute value multiplier, and/or other considerations. In some implementations, only one user may receive the first award 86.

In some implementations, in response to the change in the value of the second gameplay metric 76 for the first user 42 within the first interval 58 being determined to be greater than the change of the value of the second gameplay metric 76 for the second user 44 and/or any other users within the first interval 58, the award component 26 may be configured to determine that the first user 42 may receive the first award 86 and that the second user 44 and/or other users do not receive the first award 86.

The second award 88 may be associated with determined changes in the respective values of the first gameplay metric 70 for the first user 42, second user 44, and/or other users (e.g., an event award). For example, the determined change for the first gameplay metric 70 for the first user 42 may be the difference between the second value 74 and the first value 72. The second award 88 may be associated with user rank of the first user 42, second user 44, and/or other users by the end of the first gameplay event 50. The second award 88 may include one or more virtual items. The quantity, value, and/or other characteristic of the one or more virtual items may correspond with the rank of the users by the end of the first gameplay event 50, and/or other considerations. In some implementations, different instances of the second award 88 may be distributed to different users based on the user's final ranking. As such, in some implementations, the top ranked (e.g., top 4 and/or other considerations) users may receive different instances of the second award 88 (e.g., being of different value and/or quantity based on ranking).

In some implementations, in response to the change in the value of the first gameplay metric 70 for the first user 42 within the first event time period 52 being determined to be greater than the change of the value of the first gameplay metric 70 for the second user 44 within the first event time period 52, the award component 26 may be configured to determine that the first user 42 may receive a first instance of the second award 88 and/or that the second user 44 may receive a second instance of the second award 88, and/or other considerations. In some implementations, in response to the change in the value of the first gameplay metric 70 for the first user 42 within the first event time period 52 being determined to be greater than the change of the value of the first gameplay metric 70 for the second user 44 within the first event time period 52, the award component 26 may be configured to determine that the first user 42 may receive an instance of the second award 88 and that the second user 44 does not receive an instance of the second award 88.

The third award 90 may be associated with a determined change in the respective values of the third gameplay metric 81 for the first user 42, second user 44, and/or other users (e.g., an interval award). For example, the determined change in the third gameplay metric 81 for the first user 42 may be the difference between the sixth value 84 and the fifth value 82. The third award 90 may include, for example, an event award multiplier, one or more virtual items, an attribute value multiplier, and/or other considerations. In some implementations, only one user may receive the third award 90.

In some implementations, in response to the change in the value of the third gameplay metric 81 for the first user 42 within the second interval 64 being determined to be greater than the change of the value of the third gameplay metric 81 for the second user 44 and/or any other users within the second interval 64, the award component 26 may be configured to determine that the first user 42 may receive the third award 90 and that the second user 44 and/or other users do not receive the third award 90.

In some implementations, the fourth award 92 may be based on the performance of the users in the first interval 58, the second interval 64, and/or other intervals of the first gameplay event 50 (e.g., an award for cumulative performance in the intervals). The fourth award 92 may include, for example, an event award multiplier, one or more virtual items, an attribute value multiplier, and/or other considerations. The fourth award 92 may be distributed to the user who performed the best in the majority of the intervals of the first gameplay event 50. By way of illustration, in response to the first award 86 and third award 90 being distributed to the first user 42 and not to the second user 44, the award component 26 may be configured to determine that the fourth award 92 may be distributed to the first user 42 and not to the second user 44, and/or other considerations.

Returning to FIG. 1, the leaderboard component 28 may be configured to effectuate presentation of an event leaderboard to the users during a gameplay event, and/or other considerations. The leaderboard may reflect ongoing changes in ranking of the users during gameplay in a gameplay event. The leaderboard may be expressed as a list of users and/or user names reflecting the currently top-ranked users. For example, the leaderboard may display the top 4 users, 10 users, 15 users, 20 users, and/or other considerations. In some implementations, the leaderboard component 28 may be configured to effectuate presentation of the leaderboard as a banner, notification bar, and/or other considerations.

In some implementations, the leaderboard component may be configured such that effectuating presentation of an event leaderboard additionally comprises effectuating a presentation that reflects the distribution of the interval awards. For example, the users and/or usernames presented in connection to the leaderboard may include a graphic and/or other indicator that shows the interval awards acquired by the users, if any. This may include visually highlighting the usernames of the users that have obtained interval awards, providing a graphic alongside the username, and/or other considerations.

By way of non-limiting illustration, in FIG. 2, the leaderboard component 28 may be configured to effectuate presentation of a first leaderboard 94 in connection with the first gameplay event 50. The first leaderboard 94 may be updated in real time, or near-real time, as gameplay in the first gameplay event 50 takes place. The first leaderboard 94 may include some indication of the users who have acquired interval awards based on performance in the intervals associated with the first gameplay event 50. For example, the first leaderboard 94 may reflect the distribution of the first award 86, the third award 90, the fourth award 92, and/or other awards.

By way of further non-limiting illustration, in FIG. 3, the user interface 96 may include a leaderboard interface portion 108 (e.g., as presented by the leaderboard component 28). The leaderboard 108 may include presentation of a list of the currently top-ranked players in a gameplay event, and/or other considerations. In some implementations, if a user has obtained an interval award, the username of that user may include a graphic 110 depicted alongside the name, and/or other considerations. The graphic 110 may depict the type and/or quantity of the interval award (e.g., the multiplier amount), and/or other considerations. Users who are participating in the gameplay event may view the leaderboard 108 that reflects the distribution of interval awards to the users. The leaderboard 108 may drive participation in the gameplay event by encouraging a competitive spirit between the players.

Returning to FIG. 1, the server 12, client computing platforms 38, and/or external resources 36 may be operatively linked via one or more electronic communication links. For example, such electronic communication links may be established, at least in part, via a network 34 such as the Internet and/or other networks. It will be appreciated that this is not intended to be limiting and that the scope of this disclosure includes implementations in which servers 12, client computing platforms 38, and/or external resources 36 may be operatively linked via some other communication media.

The external resources 36 may include sources of information, hosts and/or providers of virtual spaces outside of system 10, external entities participating with system 10, external entities for player-to-player communications, and/or other resources. In some implementations, some or all of the functionality attributed herein to external resources 36 may be provided by resources included in system 10.

The server 12 may include electronic storage 32, one or more processors 14, and/or other components. The server 12 may include communication lines or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 32 may comprise electronic storage media that electronically stores information. The electronic storage media of electronic storage 32 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 32 may include one or more virtual storage resources (e.g., cloud storage, a virtual private network, and/or other virtual storage resources). Electronic storage 32 may store software algorithms, information determined by processor 14, information received from server 12, information received from client computing platforms 38, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22, 24, 26, and/or 28. Processor 14 may be configured to execute components 16, 18, 20, 22, 24, 26, and/or 28 by software; hardware; firmware; some combination of software, hardware, and/or firmware; and/or other mechanisms for configuring processing capabilities on processor 14.

It should be appreciated that although components 16, 18, 20, 22, 24, 26, and/or 28 are illustrated in FIG. 1 as being co-located within a single processing unit, in implementations in which processor 14 includes multiple processing units, one or more of components 16, 18, 20, 22, 24, 26, and/or 28 may be located remotely from the other components. The description of the functionality provided by the different components 16, 18, 20, 22, 24, 26, and/or 28 described above is for illustrative purposes and is not intended to be limiting, as any of components 16, 18, 20, 22, 24, 26, and/or 28 may provide more or less functionality than is described. For example, one or more of components 16, 18, 20, 22, 24, 26, and/or 28 may be eliminated, and some or all of its functionality may be provided by other ones of components 16, 18, 20, 22, 24, 26, 28, and/or other components. As another example, processor 14 may be configured to execute one or more additional components that may perform some or all of the functionality attributed below to one of components 16, 18, 20, 22, 24, 26, and/or 28.

Figure 4:
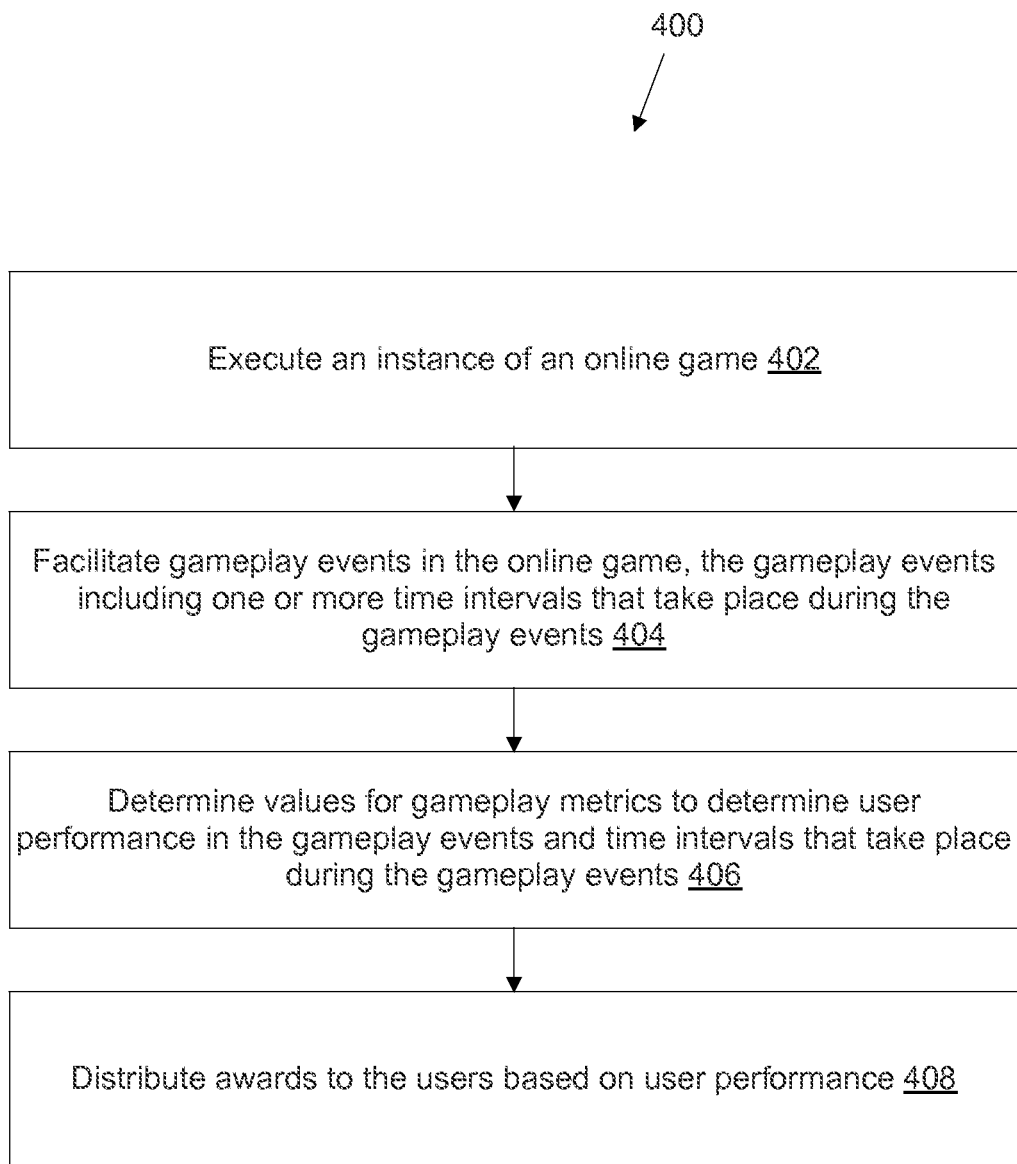
FIG. 4 illustrates a method of incentivizing user participation in gameplay events that take place in an online game, in accordance with one or more implementations.

FIG. 4 illustrates a method 400 of incentivizing user participation in gameplay events that take place in an online game. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Referring now to method 400 in FIG. 4, at an operation 402, an instance of an online game may be executed. The online game may take place in a virtual space. Executing the online game may include implementing the instance of the online game to facilitate user participation in the online game. Users may participate with the online game by controlling game entities in the virtual space. In some implementations, operation 402 may be performed by a space component the same as or similar to virtual space component 16 (shown in FIG. 1 and described herein).

At an operation 404, gameplay events that take place in the online game may be facilitated. Individual ones of the gameplay events may include one or more time intervals that take place during the gameplay events. The time intervals may correspond to incentivizing user participation in the online game during the time intervals. In some implementations, operation 404 may be performed by an event-hosting component the same as or similar to the event hosting component 22 (shown in FIG. 1 and described herein).

At an operation 406, values for one or more gameplay metrics for the users during participation in the gameplay events may be determined. The gameplay metrics may reflect one or more aspects of gameplay in an online game during the gameplay events by the users participating in the events. In some implementations, operation 406 may be performed by a gameplay metric component the same as or similar to the gameplay metric component 24 (shown in FIG. 1 and described herein).

At an operation 408, awards may be distributed to the users based on user performance in the gameplay events. The awards may include awards associated with changes in respective values of gameplay metrics for the users during one or more time intervals and/or the gameplay event as a whole. In some implementations, operation 408 may be performed by an award component the same as or similar to the award component 26 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for incentivizing participation in gameplay events that take place in an online game, the system comprising:
   one or more physical processors configured by computer-readable instructions to:
      execute an instance of an online game and to implement the instance of the online game to facilitate user participation in the online game;
      facilitate gameplay events for the users of the online game, including facilitating a first gameplay event for the first user, the first gameplay event taking place within a first event time period, wherein during the first gameplay event the first user interacts within the online game;
      determine a first set of one or more values for a first gameplay metric for the first user during the first gameplay event but outside of the first event time period;
      determine a first interval having an interval period, wherein the first interval takes place within the first event time period, and wherein the interval period is shorter than the first event time period;
      determine a second set of one or more values for the first gameplay metric for the first user during the interval period; and
      distribute one or more awards to the users based on performance within the first gameplay event, the one or more awards including a first award that is distributed to the first user, wherein the first award is based on the second set of one or more values.

2. The system of claim 1, wherein the one or more awards are different from the first gameplay metric, the first set of values, and the second set of values.

3. The system of claim 1, wherein the first award is based on a difference between the first set of one or more values and the second set of one or more values.

4. The system of claim 1, wherein the first award is independent from the first set of one or more values.

5. The system of claim 1, wherein the online game takes place in a virtual space, wherein the users participate in the online game by controlling game entities in the virtual space.

6. The system of claim 1, wherein the one or more awards further include a second award based on the first set of one or more values for the first user outside of the interval period, wherein the second award is different from the first award, and wherein the second award is distributed to the first user.

7. The system of claim 6, wherein the second award is increased responsive to both the first award and the second award being distributed to the first user.

8. The system of claim 1, wherein the one or more physical processors are configured by computer-readable instructions to effectuate presentation of a notification to the first user of a start interval time and an end interval time of the first interval.

9. The system of claim 1, wherein the one or more physical processors are configured by computer-readable instructions to effectuate presentation of a leaderboard that reflects the distribution of the first award.

10. A method of incentivizing participation in gameplay events that take place in an online game, the method being implemented in a computer system including one or more physical processors and storage media storing machine-readable instructions, the method comprising:
   executing an instance of an online game, and implementing the instance of the online game to facilitate user participation in the online game;
   facilitating gameplay events for the users of the online game, including facilitating a first gameplay event for the first user, the first gameplay event taking place within a first event time period, wherein during the first gameplay event, the first user interacts within the online game;
   determining a first set of one or more values for a first gameplay metric for the first user during the first gameplay event but outside of the first event time period;
   determining a first interval having an interval period, wherein the first interval takes place within the first event time period, and wherein the interval period is shorter than the first event time period;
   determining a second set of one or more values for the first gameplay metric for the first user during the interval period; and
   distributing one or more awards to the users based on performance within the first gameplay event, the one or more awards including a first award that is distributed to the first user, wherein the first award is based on the second set of one or more values.

11. The method of claim 10, wherein the one or more awards are different from the first gameplay metric, the first set of values, and the second set of values.

12. The method of claim 10, wherein the first award is based on a difference between the first set of one or more values and the second set of one or more values.

13. The method of claim 10, wherein the first award is independent from the first set of one or more values.

14. The method of claim 10, wherein the one or more awards further include a second award based on the first set of one or more values for the first user outside of the interval period, wherein the second award is different from the first award, and wherein the second award is distributed to the first user.

15. The method of claim 14, wherein the second award is increased responsive to both the first award and the second award being distributed to the first user.

16. The method of claim 10, further comprising effectuating presentation of a notification to the first user of a start interval time and an end interval time of the first interval.

17. The method of claim 10, additionally comprising effectuating presentation of a leaderboard that reflects the distribution of the first award.

\* \* \* \* \*